March 5, 1968  D. FIRTH  3,371,403
FLEXIBLE COUPLING MANUFACTURING
Filed Jan. 21, 1966  3 Sheets-Sheet 1

INVENTOR.
DAVID FIRTH
BY George A. Achwind

March 5, 1968  D. FIRTH  3,371,403

FLEXIBLE COUPLING MANUFACTURING

Filed Jan. 21, 1966  3 Sheets-Sheet 2

INVENTOR.
DAVID FIRTH
BY George A. Schrinel

March 5, 1968     D. FIRTH     3,371,403
FLEXIBLE COUPLING MANUFACTURING
Filed Jan. 21, 1966     3 Sheets-Sheet 3

INVENTOR.
DAVID FIRTH
BY George A. Schwind

United States Patent Office 3,371,403
Patented Mar. 5, 1968

3,371,403
FLEXIBLE COUPLING MANUFACTURING
David Firth, 1441 E. Jefferson Blvd.,
South Bend, Ind. 46617
Filed Jan. 21, 1966, Ser. No. 522,200
7 Claims. (Cl. 29—416)

This invention relates to improvements in a method of making a coupling, and in particular to a method of making two halves of a flexible coupling from a single casting in a novel manner so as to produce a perfectly concentric assembly.

The present application for an improved method of manufacturing a flexible coupling is related in subject matter to applicant's copending apparatus applications bearing Ser. Nos. 425,801, now Patent No. 3,328,978, granted July 4, 1967; 467,511, and 507,865, filed on Jan. 15, 1965, June 28, 1965, and Nov. 15, 1965, respectively. The flexible couplings therein disclosed are comprised of a pair of faced members, one of which is mounted on each of two axially positioned shafts, the members being connected on their outer periphery by some flexible means, such as an endless V-belt or tire-like element which surrounds the said members to form a driving connection whereby rotation of one shaft transmits rotation to the other shaft. The faced members disclosed in the above cited applications are of the type having offset sectors projecting toward each other which are dovetailed into each other upon assembly of the coupling. The flexible element is then positioned around the offset sectors and secured thereto so as to engage them alternately around the periphery of the coupling members. Dovetailing the coupling sectors into each other provides a positive drive of the members in the event the flexible element is broken or becomes disengaged from the periphery of the assembly. During normal operation, the coupling sectors are prepositioned and separated from each other by the flexible element, the latter of which is normally secured to each offset section or sector.

It is apparent that the outer periphery of the coupling members is an interrupted surface so that machining of the outer periphery for the purpose of providing a V-belt groove or the like for locating the coupling's flexible element becomes a difficult task and a damaging operation to the cutting tool.

Heretofor, coupling members of the type having interrupted outer surfaces were separately machined in a conventional manner and upon dovetailing the coupling members together for assembly and operation, substantial misalignment of the machined grooves and rim portions would occur since the members were not machined simultaneously or integrally. Such misalignment also contributed to shaft misalignment, vibration and unbalance since the machined surfaces were not perfectly concentric. Although it is possible to cast separate coupling members and machine the face portions and rims and then remove the remainder of the face portion to accommodate the mating coupling, this obviously creates extensive machining and also excessive waste of material since only a portion of the face member is utilized.

The invention herein disclosed alleviates the separate machining of interrupted surfaces of the coupling members by having a one piece novel casting and core arrangement which places the coupling sectors in the position which they will maintain during normal operation of the assembled coupling. It also places the members in concentric alignment so that a continuous machining operation may be simultaneously performed on the outer peripheries of the coupling members so that perfect concentricity is assured. Subsequent separation of the coupling members by a sawing or milling operation to thereby sever the two similar, concentric coupling members which form the basis for a coupling assembly completes the novel method of manufacturing.

It is, therefore, the primary object of the present invention to provide an improved method of manufacturing coupling members wherein a single casting is formed by a novel core and whereby all machining is completed on the casting prior to severing the casting into two perfectly concentric coupling members.

It is a further object of the instant invention to form a single casting of continuous, smooth exterior surfaces whereby machining operations are readily performed on uninterrupted surfaces thereby resulting in perfect concentricity upon severance of the casting to thereby form two coupling members having interrupted offset sectors.

It is a further object to form and manufacture a pair of symmetrical coupling members having perfectly concentric, aligned means located on the outer periphery of the coupling for accepting a flexible element since all machining operations are performed on a single casting before separation of the parts.

A further object is to produce coupling members in which the material waste factor is substantially reduced since only small overlapping segments are required to be removed for separation of the casting into two identical coupling members.

It is a further object to provide an improved method of manufacturing coupling members which substantially reduces the cost of material, handling, and manufacturing since only a single casting is utilized.

And still a further object is to manufacture a coupling having two members which are uniform in construction and appearance and which are perfectly concentric and in parallel and peripheral alignment.

A further object is to provide an improved method of manufacturing wherein only a single casting is needed for two coupling members due to a novel chamber core.

These and other objects of the invention will become apparent from the following specification which, when taken in conjunction with the accompanying drawings, illustrates a preferred form of the invention.

Figure 1:
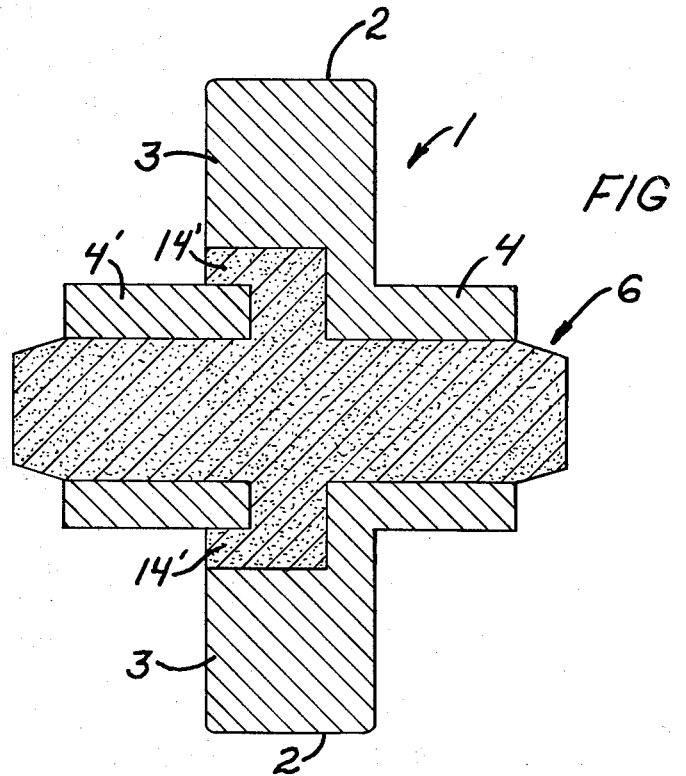
FIG. 1 is a cross sectional view taken along the axis of the casting and core.
Figure 2:
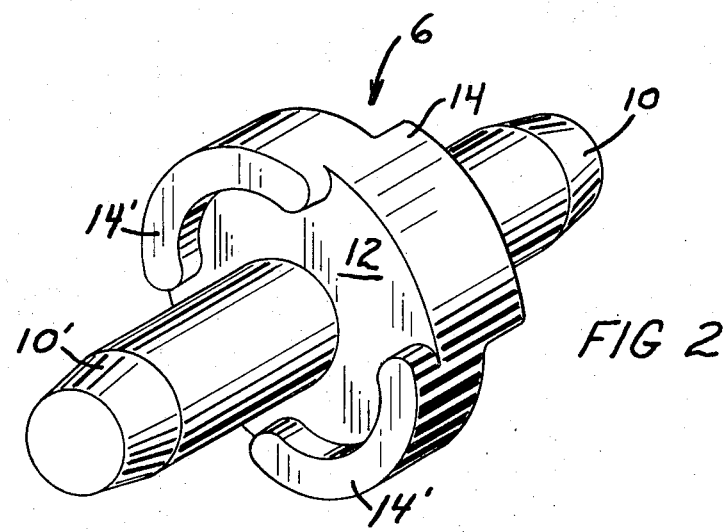
FIG. 2 is a perspective of the core.

With reference to the drawing, and in particular FIGS. 1 and 2, the casting, generally designated as 1, is cylindrical, symmetrical and comprises an integral piece having a continuous outer rim 2 and hub portions 4, 4'. For purposes of clarity, the mold in which the casting is formed is not shown. However, any conventional, split mold may be utilized to produce the desired hub and rim design. A hard, dry, sand core 6, as clearly shown in FIG.

2, is positioned symmetrically with respect to the mold so as to centrally locate the core 6 therein.

When molten metal is poured into the mold, the core 6 is surrounded by the metal to thereby form an integral casting which will subsequently be severed into two coupling members after all machining has been completed, in a manner hereinafter described.

With reference to FIG. 1, the outer rim 2 of the casting 1 includes offset sectors 3 which are directed axially away from the hub portion 4 with which it is integral. The offset sectors 3, 3 are diametrically opposite each other so that each coupling member, upon severance of the casting, consists of two offset sectors. However, any plurality of sectors could be cast at equidistant intervals with the same principle of forming being applied as disclosed herein.

The core 6 includes shaft-like members 10, 10' which are less than the desired diameter on which the final coupling members will be mounted so that the hubs may be smoothly bored to the exact dimension. Although shown to be of the same diameter, the members 10, 10' may be of unequal diameter depending on the particular application of the coupling. A central core portion, generally designated as 12, has offset outlets 14, 14' which extend axially at a predetermined distance from the central core portion and the shaft-like members, as shown in FIG. 2. It is noted that the offset outlets 14, 14' are positioned so as to separate the offset sectors from the other hub member. Note FIG. 1 wherein offset sectors 3 are separated from the other coupling members hub 4' by offset outlet 14'.

Figure 3:
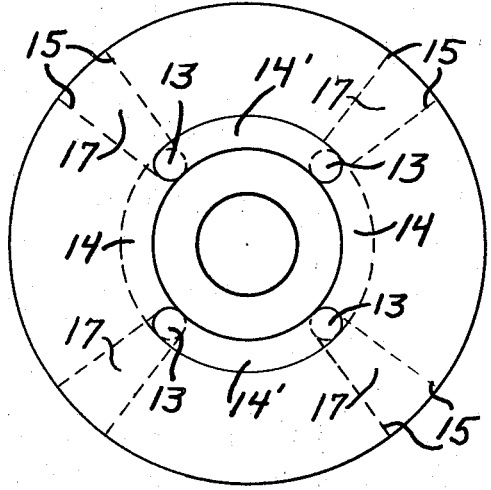
FIG. 3 is a front elevation of the casting showing in dotted lines the location of the cuts for severing of the coupling members.

The offset outlets 14, 14' of core 6 overlap each other at their radial ends in an axial direction, as seen in FIG. 3, and, are staggered peripherally on the outer extremity of central core portion 12 (FIGS. 1–3). With reference to FIG. 3, it is seen that the outlets 14, 14' are staggered, wherein outlets 14, 14, located on one side of the central core portion 12 are diametrically opposite each other. Conversely, portions 14', 14', are staggered with respect to outlets 14, 14 and are also diametrically opposite each other on the other side of core portion 12. The axial overlap between the two outlets is identified on FIG. 3 as element 13 and represents the only waste of material in manufacturing the two coupling members.

From the above it is apparent that the novel core 6 and its overlapping outlets form an integral casting when the said casting is removed from its respective mold. The core will be removed from the casting by standard methods such as tumbling which breaks up the core and it will fall out before machining.

The completion and separation of the coupling members would be as follows. The integral casting 1 would be machined by placing one of the hubs 4 or 4' in a lathe chuck or the like and thereby machine the opposite hub to the desired diameter. Subsequent to machining the first hub, the hub is drilled to a diameter to accept the desired diameter shaft on which the hub will be mounted for operation. Drilling of the hubs may also be done after both hubs are machined and if different diameter shafts are to be utilized, the drilling of each hub separately after machining would be required. The casting would then be turned end for end so as to place the previously machined hub in a lathe chuck or the like to enable machining of the other hub. The machining would then be continued until the rim portion or outer periphery 2 is machined to accept the desired type of flexible coupling element. It is noted that all machining on the rims and hubs is performed on a continuous, smooth, surface, devoid of interruptions except for minor surface deformities which may occur during casting of the casting 1.

Figure 6:
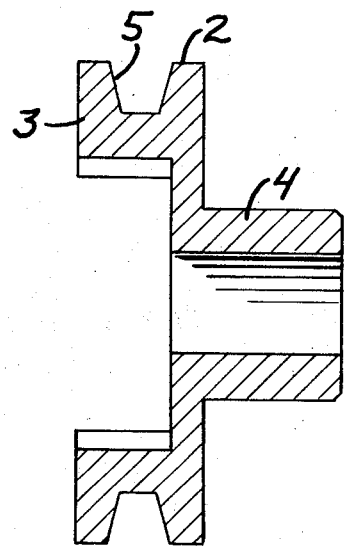
FIG. 6 is a sectional view taken along the axis of a machined coupling member subsequent to severance of the casting and showing the grooves which accommodate a V-belt flexible element.

With reference to FIG. 6, if the flexible element for the coupling assembly is a V-belt (not shown), the rim portion 2 of offset sector 3 would be machined to form a V-belt groove 5 of the desired depth and contour. The desired diameter of shaft hole 8 would then be bored after one of the hubs were machined.

Figure 7:
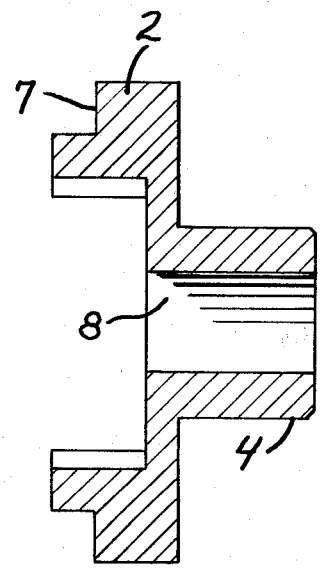
FIG. 7 is a sectional view similar to FIG. 6 showing the outer periphery of the coupling member which is machined to accommodate a tire-like flexible element.

Similarly, with reference to FIG. 7, if the flexible element for the coupling assembly is of the tire-like configuration, the rim portion 2 of offset sector 3 would be machined to form a radial recess 7 so that the tire-like element (not shown) may thereby straddle the rim portion and be affixed thereto. It is noted that the tire-like element, depending upon its width, may not necessitate a recess so that the only machining would be to smooth the exterior surfaces.

With reference to the specific types of flexible elements utilized in FIGS. 6 and 7, the machining operation may be performed when the casting is secured for machining either hub since the grooves 5 and 7 are radially formed by cutting tools moving transverse to the axis of the hubs 4, 4'.

Figure 8:
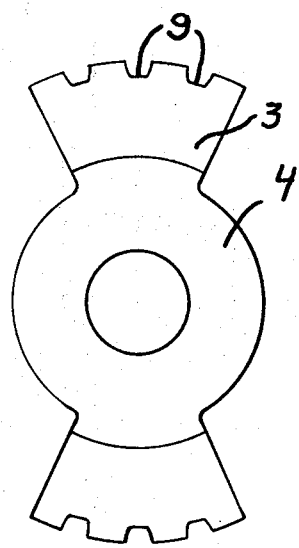
FIGS. 8 and 9 show a front and sectional view, respectively, of a coupling member wherein the outer periphery is machined to accept a flexible element having teeth meshing with the formed teeth on the outer periphery of the said member.
Figure 9:
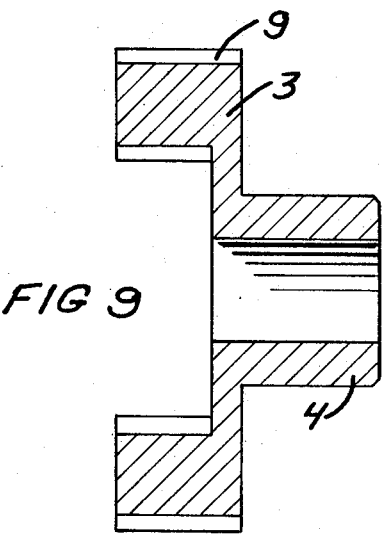

With reference to FIGS. 8 and 9, if the flexible element for the coupling assembly is of the elastomer type having tooth-like projections on its inner periphery which are adapted to enmesh with recesses 9 which are located axially along the outer periphery of offset sectors 3, the machining operation may be one of milling, hobbing or shaping in a gear cutting machine. The latter operation would be performed subsequent to the machining of hub members 4, 4' as set forth supra. The tooth recesses would be formed by removing the material by machining in a direction parallel to the axis of the coupling in said shaping and milling operations.

Upon completion of all machining operations on the integral casting 1, and with reference to FIG. 3, the casting is then sawed or milled along lines 15 radially inwardly to approximately the hubs 4, 4' whereby the overlap portions 13 of the core 6 will be removed so that the integral casting will be severed into two coupling members which are perfectly concentric and identical. If a sawing operation is performed, the segments 17 will be freed from the casting at the termination of the cut when the outlet portions 14, 14' are entered by the saw. A severed coupling element subsequent to separation will have the appearance as shown in either FIG. 6, 7, or 9, depending on the particular operation performed on the outer rim of the casting, which in turn is dependent on the type of flexible element desired to be utilized.

Figure 4:
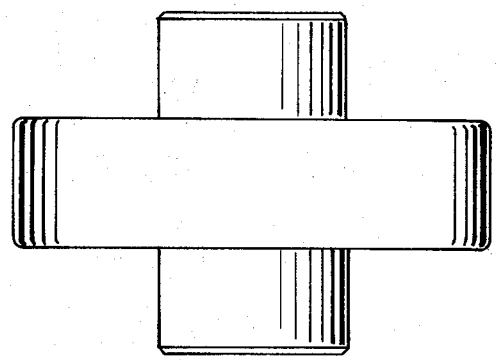
FIG. 4 is a side elevation of the casting.

Prior to any machining on the outer rim, the exterior of the casting is a smooth, continuous, surface, as shown in FIG. 4.

Figure 5:
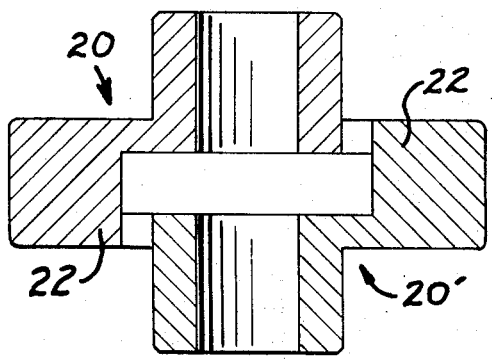
FIG. 5 is a sectional view of a blank casting after severance of the coupling members and showing the prepositioning of the members during normal operation.

FIG. 5 shows a blank type coupling for purposes of illustration after severance or separating of the coupling members whereby it is readily seen how the two members 20 and 20', having offset sectors 22, 22', are dovetailed into each other during normal operation of the coupling. The particular choice of flexible element to be utilized would be dependent on the type of application, load, speed, and other variable factors.

It is evident from the foregoing description of the invention that a coupling manufactured in the method described herein will enable manufacturing of identical coupling members which are concentric, balanced, and symmetrical. Further, the production costs will be greatly reduced by utilizing the method herein disclosed, as will the waste factor.

Although the types of coupling members disclosed herein are directed to those having offset sectors and which dovetail into each other, it is understood that other types of flexible elements and coupling designs could be utilized which would still fall within the scope of the appended claims and within the spirit of the instant invention. Similarly, multiple groove arrangements for a plurality of flexible elements could be performed on the casting to thereby increase the capacity of the coupling if so desired, and, non-flexible members could be substituted for flexible elements, i.e., chains for elastomer type of toothed belts.

I claim:

1. The method of manufacturing a pair of identical coupling members having face members with offset sectors which dovetail into each other and hubs adapted for mounting on shafts, comprising the steps of:

(a) forming said coupling members in an integral casting having a central core, the core providing a separation between the offset sectors of one member from the hub of the other and whereby said offset sectors overlap each other to form a continuous outer surface;

(b) machining one of said hubs;

(c) boring said hubs;

(d) machining the second hub;

(e) machining the outer periphery of said offset sectors in an uninterrupted manner; and (f) severing the casting into two parts by removing the said overlapping portions of said offset sectors to thereby form two concentric, identical coupling members.

2. The method of manufacturing a pair of identical coupling members according to claim 1 wherein the outer periphery of said offset sectors is machined to form a groove therein to accept a V-belt flexible element.

3. The method of manufacturing a pair of identical coupling members according to claim 1 wherein the outer periphery of said offset sectors is machined to form a recess on at least one side of said sectors whereby said sectors will accept a tire-like flexible element straddled thereon.

4. The method of manufacturing a pair of identical coupling members according to claim 1 wherein the outer periphery of said offset sectors is machined in an axial direction relative to said hubs to thereby form teeth on the outer periphery of said sectors.

5. The method of manufacturing a pair of identical coupling members according to claim 1 wherein the overlapping portions of said offset sectors are removed by axially milling said casting to a radial point to said hubs.

6. The method of manufacturing a pair of identical coupling members according to claim 1 wherein the overlapping portions of said offset sectors are removed by axially cutting said casting to a radial point to said hubs.

7. The method of manufacturing a pair of identical coupling members having face members with offset sectors which dovetail into each other and hubs adapted for mounting on shafts, said members being connected by a flexible element encircling the outer periphery of said sectors, comprising the steps of:

(a) forming said coupling members in an integral casting having a central core, the core providing a separation between the offset sectors of one member from the hub of the other and whereby said offset sectors overlap each other to form a continuous outer surface;

(b) machining one of said hubs;

(c) boring said hubs;

(d) machining the second hub;

(e) machining the outer periphery of said offset sectors in an uninterrupted manner and forming at least one circumferential groove therein; and (f) severing the casting into two parts by removing the said overlapping portions of said offset sectors by machining radially to said hubs in an axial direction to thereby separate said casting to form two concentric, identical coupling members.

References Cited

UNITED STATES PATENTS

| | | | |
|---|---|---|---|
| 2,382,245 | 8/1945 | McCormack | 29—416 |
| 2,480,214 | 8/1949 | Bergstrom | 29—416 |
| 3,166,835 | 1/1965 | Kolbe | 29—414 |
| 3,180,019 | 4/1965 | Pollaschek | 29—414 |
| 3,328,978 | 7/1967 | Firth | 64—12 |

THOMAS H. EAGER, *Primary Examiner.*